US011729168B2

(12) United States Patent
Shieh et al.

(10) Patent No.: US 11,729,168 B2
(45) Date of Patent: Aug. 15, 2023

(54) SYSTEM AND METHOD FOR MANAGING SECURITY CREDENTIALS OF A USER IN A COMPUTING ENVIRONMENT

(71) Applicant: Appaegis Inc., Palo Alto, CA (US)

(72) Inventors: Choung-Yaw Michael Shieh, Palo Alto, CA (US); Yonghui Cheng, Cupertino, CA (US)

(73) Assignee: Appaegis Inc., Palo Alto, CA (US)

( * ) Notice: Subject to any disclaimer, the term of this patent is extended or adjusted under 35 U.S.C. 154(b) by 297 days.

(21) Appl. No.: 17/209,664

(22) Filed: Mar. 23, 2021

(65) Prior Publication Data

US 2022/0311770 A1  Sep. 29, 2022

(51) Int. Cl.
  *H04L 9/40* (2022.01)
(52) U.S. Cl.
  CPC .......... *H04L 63/0884* (2013.01); *H04L 63/20* (2013.01)
(58) Field of Classification Search
  CPC ... H04L 63/0884; H04L 63/20; H04L 63/083; H04L 63/102
  USPC .............................................................. 726/1
  See application file for complete search history.

(56) References Cited

U.S. PATENT DOCUMENTS

| 9,110,700 | B2 | 8/2015 | McKenzie et al. |
| 9,129,104 | B2 | 9/2015 | Ferwerda et al. |
| 2003/0191812 | A1* | 10/2003 | Agarwalla ............ H04L 69/329 709/212 |
| 2020/0128085 | A1* | 4/2020 | Khait .................... H04L 67/02 |
| 2021/0029089 | A1* | 1/2021 | Lewin ................. H04L 63/1408 |
| 2021/0034735 | A1* | 2/2021 | Tkaczyk ................ G06F 21/46 |
| 2022/0150254 | A1* | 5/2022 | Shieh .................. H04L 63/1425 |
| 2022/0311770 | A1* | 9/2022 | Shieh .................... H04L 63/102 |

* cited by examiner

*Primary Examiner* — Kambiz Zand
(74) *Attorney, Agent, or Firm* — Jason C. Cameron

(57) ABSTRACT

A system and method for managing security credentials of a user are disclosed. The method includes establishing a connection with a local web browser hosted on a user device. The method also includes receiving a request for accessing a web application on the local web browser hosted on the user device. The method also includes determining whether current web page associated with the web application on the local web browser requires authentication of the user. Further, the method includes determining a password policy. Furthermore, the method includes authenticating the user on the web page using pre-stored user credentials based on the determined password policy. Additionally, the method includes routing the web page of the local web browser to the web application via an intermediate web browser. Also, the method includes providing access of the web application to the local web browser based on privileges associated with the user.

18 Claims, 4 Drawing Sheets

SYSTEM AND METHOD FOR MANAGING SECURITY CREDENTIALS OF A USER IN A COMPUTING ENVIRONMENT

FIELD OF INVENTION

Embodiments of a present disclosure relate to security systems and more particularly to a system and a method for managing security credentials of a user in a computing environment.

BACKGROUND

Authentication is an essential component in preventing abuse and unauthorized access to network-based services. Without secure methods of authentication, many services offered online such as e-mail, banking, credit card management, bill-paying, shopping, etc., could not exist. One common method of authentication is through password verification. However, conventional password protection is often inadequate to protect against the increasing number and sophistication of methods employed by bad actors who seek to gain unauthorized access to online services by stealing passwords and other sensitive information from users. Typical methods of obtaining passwords and other sensitive user information include the use of malware (malicious software), phishing, pharming, man-in-the-middle attacks, and "shoulder surfing".

In any given authentication method, a user has to remember their passwords towards multiple applications. In such a case, it is common that the users re-use the same password for many applications. This raises a major security issue for many enterprises. The other password security problem is the increasing threats of keyloggers which are used by hackers to steal credentials. Once a keylogger infects a computer or laptop, it steals the credentials when the user enters the username and password on a login page. There are no effective ways to prevent it.

The traditional ways of password management is to install a password manager as an extension in a web browser. However, the password manager cannot protect password secrecy. If the keylogger has been running on the local computer, the malware could detect and steal the username and password from application programming interfaces (API), or keystrokes used by the password manager. The local password manager also has the limitation that it could not prevent users from knowing the password.

Hence, there is a need for an improved system and a method for managing security credentials of a user in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a system for managing security credentials of a user in a computing environment is disclosed. The system includes one or more hardware processors and a memory coupled to the one or more hardware processors. The memory includes an intermediate web browser subsystems in the form of programmable instructions executable by the one or more hardware processors. The intermediate web browser subsystem includes a communication subsystem configured for establishing a connection with a local web browser hosted on a user device using a communication channel. The intermediate web browser subsystem further includes a request handler subsystem configured for receiving a request for accessing a web application on the local web browser hosted on the user device from a user. Also, the intermediate web browser subsystem includes a web page handler subsystem configured for determining whether current web page associated with the requested web application on the local web browser requires authentication of the user. Further, the intermediate web browser subsystem includes a password policy handler subsystem configured for determining password policy associated with the requested web application if the current web page associated with the requested web application requires authentication of the user. Furthermore, the intermediate web browser subsystem includes an authentication subsystem configured for authenticating the user on the current web page using pre-stored user credentials based on the determined password policy. Moreover, the intermediate web browser subsystem includes a routing subsystem configured for routing the current web page of the local web browser to the requested web application via an intermediate web browser upon successful authentication of the user. Additionally, the intermediate web browser subsystem includes an access management subsystem configured for providing access of the web application to the local web browser hosted on the user device based on one or more access privileges associated with the user.

In accordance with another embodiment of the present disclosure, a method for managing security credentials of a user in a computing environment is disclosed. The method includes establishing a connection with a local web browser hosted on a user device using a communication channel. The method also includes receiving a request for accessing a web application on the local web browser hosted on the user device from a user. The method also includes determining whether current web page associated with the requested web application on the local web browser requires authentication of the user. Further, the method includes determining a password policy associated with the requested web application if the current web page associated with the requested web application requires authentication of the user. Furthermore, the method includes authenticating the user on the current web page using pre-stored user credentials based on the determined password policy. Additionally, the method includes routing the current web page of the local web browser to the requested web application via an intermediate web browser upon successful authentication of the user. Also, the method includes providing access of the web application to the local web browser hosted on the user device based on one or more access privileges associated with the user.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
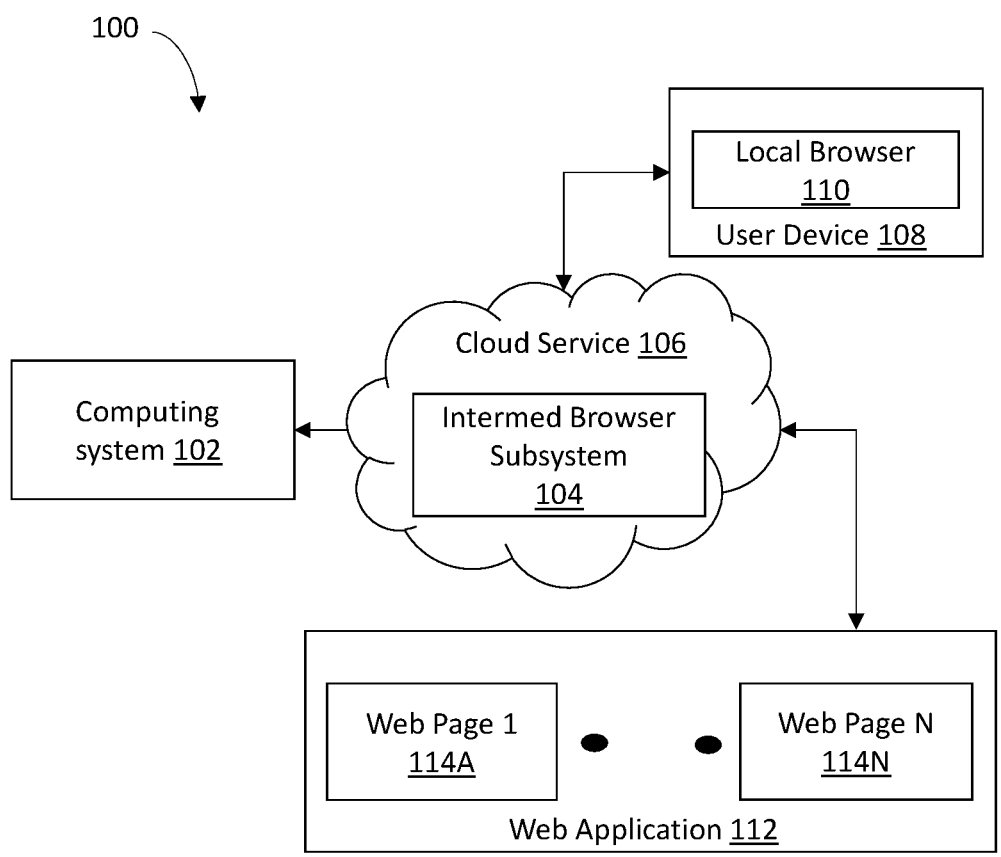
FIG. 1 is a block diagram illustrating an exemplary computing environment for managing security credentials of a user in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "subsystem" that is configured and operated to perform certain operations. In one embodiment, the "subsystem" may be implemented mechanically or electronically, so a subsystem may comprise dedicated circuitry or logic that is permanently configured (within a special-purpose processor) to perform certain operations. In another embodiment, a "subsystem" may also comprise programmable logic or circuitry (as encompassed within a general-purpose processor or other programmable processor) that is temporarily configured by software to perform certain operations.

Accordingly, the term "subsystem" should be understood to encompass a tangible entity, be that an entity that is physically constructed permanently configured (hardwired) or temporarily configured (programmed) to operate in a certain manner and/or to perform certain operations described herein.

Throughout this document, the terms browser and browser application may be used interchangeably to mean the same thing. In some respects, the terms web application and web app may be used interchangeably to refer to an application, including metadata, that is installed in a browser application. In some respects, the terms web application and web app may be used interchangeably to refer to a website and/or application to which access is provided over a network (e.g., the Internet) under a specific profile (e.g., a website that provides email service to a user under a specific profile). In some respects, the term application, when used by itself without modifiers, may be used to refer to, but is not limited to, a web application and/or an extension application that is installed or is to be installed in the browser application.

Embodiments of the present disclosure disclose a system and method for managing security credentials of a user in accordance with an embodiment of the present disclosure. The present disclosure creates a monitoring and control mechanism using on an intermediate web browser, to monitor how passwords are entered in login pages in applications. The intermediate web browser detects password strength or duplicated passwords and enforce password policy to prevent weak passwords or duplicated passwords. The intermediate web browser enters security credentials of the user such as the username and password (or other information) for the users, such that the users could access the applications without manually entering the passwords. This provides great benefits to automate the password management and enforce password policy, without installing any software on users' local computer. The present disclosure provides a method and system to enable administrators to deploy a secure password manager in an intermediate web browser to automate the password management. The password management model isolates the password to prevent password stealing from the keyloggers and relieves users from manual password management.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 is a block diagram illustrating an exemplary computing environment 100 for managing security credentials of a user in accordance with an embodiment of the present disclosure. According to FIG. 1, the cloud computing environment 100 comprises a cloud computing system 102 which is capable of delivering cloud applications such as web applications 112 to user device 108. Throughout the specification the term 'cloud computing system' may also be referred as 'system' and the 'computing system'. The cloud computing system 102 is connected to a local web browser 110 in the user device 108 via a cloud service 106. The cloud service 106 includes various logic, including networking, application scanning, document processing, and the like. The cloud computing system 102 comprises an intermediate web browser subsystem 104 configured to manage the security credentials of the user. The intermediate web browser subsystem 104 may be an additional web browser through which the local web browser 110 communicates with the web application 112 and the computing system 102. The intermediate web browser 104 acts as an authentication gateway managing and controlling security credentials of the user when the user desires to access the web application 112. In one embodiment, 'intermediate web browser' may also be referred as 'intermediate web browser subsystem' throughout the specification. The intermediate web browser may be any web browser known in the art. In one specific embodiment, the one or more communication networks may include, but not limited to, an internet connection, a wireless fidelity (WI-FI) and the like. Although FIG. 1 illustrates the cloud computing system 102 connected to one user device 108 and one web application 112, one skilled in the art can envision that the cloud computing system 102 can be connected to several user devices located at different locations and several web applications via the cloud service 106.

The user devices 108 can be a laptop computer, desktop computer, tablet computer, smartphone, and the like. The user device 108 can access web applications 112 via a local web browser 110. As an example, a user of a user device 108 may access a particular web application 112 by launching a web browser, such as local web browser 110, typing into the web browser's address bar a Uniform Resource Locator (URL) address for a web page 114A-N whose rendering causes execution of the web application 112, and selecting an "enter" key on the user's keyboard. The local web browser 110 may send a Hypertext Transfer Protocol (HTTP) request over the internet to the intermediate web browser subsystem 104 for resources that correspond to the URL.

In response to the HTTP request, the local web browser 110 may receive from the intermediate web browser subsystem 104, a set of resources that the intermediate web browser subsystem 104 identified as relevant for the URL (e.g., HTML for a web page, a CSS document, and a JavaScript file). The local web browser 110 may execute the resources, for example, by rendering a parent HTML file and executing other resources referenced therein. The execution of the resources may cause the local web browser 110 to effectively "display" the web application 112 on a display device of the user device 108.

The web application 112 may be a normal website that includes extra metadata that is installed as part of the browser application. Installable web apps may use standard web technologies for server-side and client-side code. Examples of web applications 112 may include, but not limited to, office applications, games, photo editors, and video players that are run inside the browser. In an embodiment, the web applications 112 may be deployed on the cloud computing system 102 or on any external enterprise data centre.

The web application 112 includes one or more web pages 114A-N. The basic steps involved in displaying a web page 114A-N on a local web browser 110 include the local web browser 110 requesting a page from the computing system 102. The computing system 102 then determines which web application 112 is to handle the request, e.g., asp, php, jsp and the like. A request is made by the computing system 102 to the determined web application 112 to render the web page 114A-N. The web application 112 renders the page content and streams it back to the computing system 102, which in turn renders the web page 114A-N back to the local web browser 110 via the cloud service 106. The rendering of a page involves the execution of code to transform a template specification for the page into browser readable content (typically HTML, but not restricted to this only). According to an embodiment of the present disclosure, when the local web browser 110 requests a web page, the request is first routed to the intermediate web browser subsystem 104 within the cloud computing system 102. When once the intermediate web browser subsystem 104 receives the web page 114A-N from the web application 112, the intermediate web browser subsystem 104 determines if the web page 114A-N received contains authentication fields. If yes, then the intermediate web browser subsystem 104 itself authenticates the user using pre stored user credentials without routing the page back to the local web browser 110, hence allowing the users at the user device 108 to access the web application 112 without the need for user inputting the credentials manually.

The cloud computing system 102 includes a cloud interface, cloud hardware and OS, a cloud computing platform, and a database. The cloud interface enables communication between the cloud computing platform and the user device 108. Also, the cloud interface enables communication between the cloud computing platform and the web application 112. The cloud hardware and OS may include one or more servers on which an operating system is installed and including one or more processing units, one or more storage devices for storing data, and other peripherals required for providing cloud computing functionality. The cloud computing platform is a platform which implements functionalities such as data storage, data analysis, data processing, data communication on the cloud hardware and OS via APIs and algorithms and delivers the aforementioned cloud services. The cloud computing platform may include a combination of dedicated hardware and software built on top of the cloud hardware and OS. As used herein, "cloud computing environment" refers to a processing environment comprising configurable computing physical and logical assets, for example, networks, servers, storage, applications, services, etc., and data distributed over the cloud platform. The cloud computing environment 100 provides on-demand network access to a shared pool of the configurable computing physical and logical assets. The server may include one or more servers on which the OS is installed. The servers may comprise one or more processors, one or more storage devices, such as, memory units, for storing data and machine-readable instructions for example, applications and application programming interfaces (APIs), and other peripherals required for providing cloud computing functionality.

Those of ordinary skilled in the art will appreciate that the hardware depicted in FIG. 1 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a cloud computing system 102 as is unique to the present disclosure or necessary for an understanding of the present disclosure is depicted and described. The remainder of the construction and operation of the cloud computing system 102 may conform to any of the various current implementation and practices known in the art.

Figure 2:
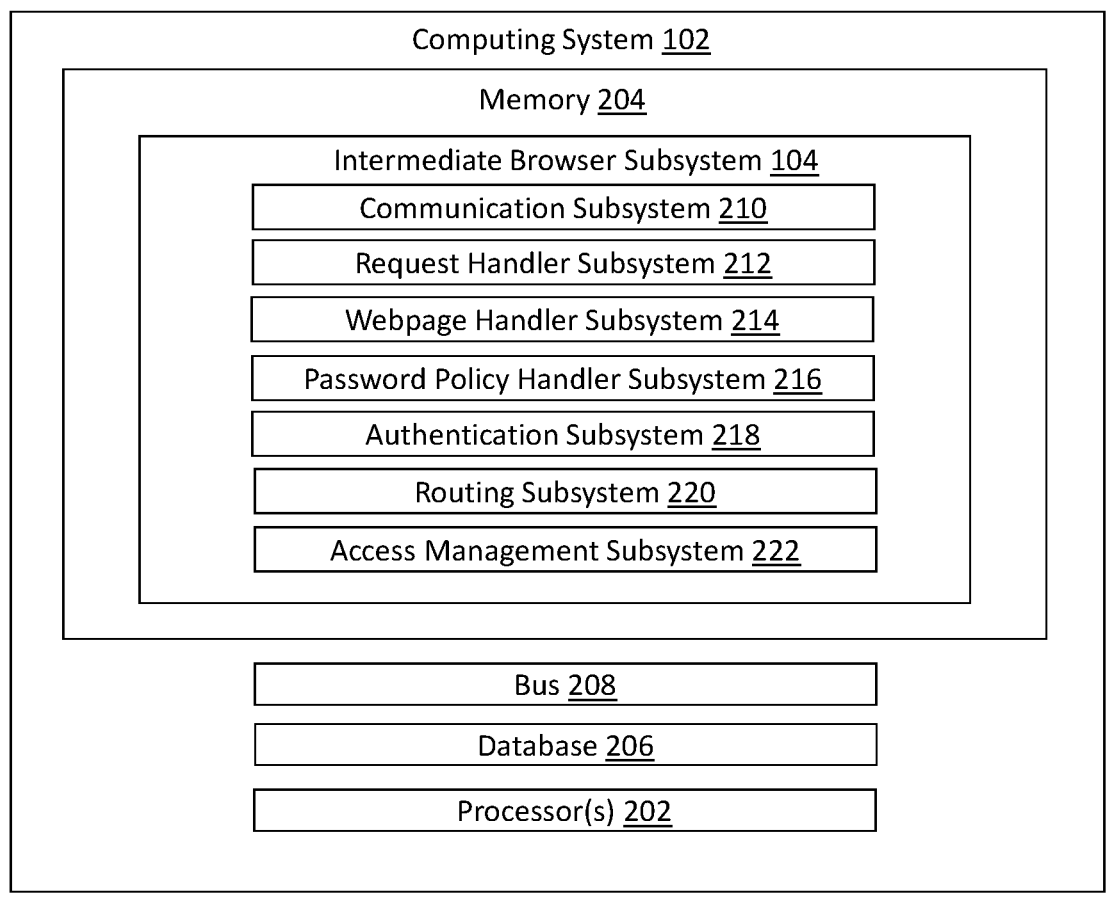
FIG. 2 is a block diagram illustrating an exemplary computing system, such as those shown in FIG. 1, for managing security credentials of a user in accordance with an embodiment of the present disclosure.

FIG. 2 is a block diagram illustrating an exemplary computing system 102, such as those shown in FIG. 1, for managing security credentials of a user in accordance with an embodiment of the present disclosure. In FIG. 2, the cloud computing system 102 comprises a processor 202, a memory 204, and a database 206. The processor 202, the memory 204 and the database 206 are communicatively coupled through a system bus 208 or any similar mechanism. The memory 204 comprises an intermediate web browser subsystem 104 (such as those shown in FIG. 1) in the form of programmable instructions executable by the one or more hardware processors 202. The intermediate web browser subsystem 104 further includes a communication subsystem 210, a request handler subsystem 212, a web page handler subsystem 214, a password policy handler subsystem 216, an authentication subsystem 218, a routing subsystem 220 and an access management subsystem 222.

The processor(s) 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The processor(s) 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the processor(s) 202, such as being a computer-readable storage medium. The processor(s) 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes the intermediate web browser subsystem 104 stored in the form of machine-readable instructions on any of the above-mentioned storage media and may be in communication with and executed by the processor(s) 202.

The communication subsystem 210 is configured for establishing a connection with a local web browser 110 hosted on a user device 108 using a communication channel, such as cloud service 106.

The request handler subsystem 212 is configured for receiving a request for accessing a web application 112 on the local web browser 110 hosted on the user device 108 from a user. The request comprises information relating to the web application 112, such as URL, or network identifier of the web application 112. Also, the request comprises local web browser 110 information such as internet protocol address and the like. In an embodiment, the request may also comprise user device information and user information. The user device information may be device configuration, hardware resource information or the like. The user information may be a username, user profile identifier and the like. The web application 112 may be hosted on the computing system 102 or on any external data center.

The web page handler subsystem 214 is configured for determining whether current web page 114A-N associated with the requested web application 112 on the local web browser 110 requires authentication of the user. The web pages 114A-N comprises one or more links to the resources requested by the user in their request, and any additional files or documents related to the web application 112. The web pages 114A-N also comprises one or more user inputtable fields such as for example authentication field. In an exemplary embodiment, one of the one or more web pages 114A-N may be a login page. Further, the web pages 114A-N may include user account related information such as account identifier or company identifier. In determining whether current web page associated with the requested web application 112 on the local web browser 110 requires authentication of the user, the web page handler subsystem 214 is configured for forwarding the received request to the requested web application 112 using the intermediate web browser 104. Further, the web page handler subsystem 214 is configured for receiving the current web page 114A-N associated with the requested web application 112 in response to the request forwarded to the web application 112. Furthermore, the web page handler subsystem 214 is configured for identifying whether the current web page 114A-N associated with the requested web application 112 comprises one or more user authentication fields. The user authentication fields may be username field, user password field, one time password field or any other confidential information associated with the user. For example, the current web page 114A-N is parsed to determine the authentication fields. Further, the web page handler subsystem 214 is configured for determining whether the current web page 114A-N associated with the requested web application 112 requires user credentials to be inputted onto the one or more user authentication fields.

The password policy handler subsystem 216 is configured for determining a password policy associated with the requested web application 112 if the current web page 114A-N associated with the requested web application 112 requires authentication of the user. A password policy may be a set of rules governing a password scheme or standard set forth by the web application 112. For example, these rules may be evaluating password strength, duplication of passwords, captchas, password rotation and the like. The password policy may be configured for the login pages to the following modes, namely, 'no action', 'user managed password' and 'administrator managed password'. The password policy enforces the password scheme based on admonitor's preference. The admonitors may choose to manage the password in the following ways. Firstly, in the mode 'no action', the password policy handler subsystem 216 only monitors the web pages 114A-N of the web application 112, however does not control the web pages 114A-N of the web application 112. In the 'user managed password' mode, the password policy handler subsystem 216 first determines if it is the first time the user visits the web page 114A-N. If yes, then the password policy handler subsystem 216 monitors the username and password that users enter on the login pages and stores the username and password as security credentials of the user. Subsequently, when the users visit the login page next time, the authentication subsystem 218 fills in the username and password information such that the users may not enter these user credentials again on the login page. In the 'admin managed password' mode, the login username and password are pre-configured either manually or for the login pages of the applications 112. When the login page, 114A-N of the application 112 is detected, and if the username and password information have been pre-configured, then the password policy handler subsystem 216 enters the username and password of the user on the login page 114A-N, thus allowing the users to have access to the applications 112 without needing to enter any security credentials.

In an embodiment, the password policy handler subsystem 216 monitors when users change their passwords. In this case, the password policy handler subsystem 216 evaluates the password policy such as the password strength and checks if the password is duplicated from existing passwords in other applications. If the password policy handler subsystem 216 detects any violation of the password policy, the password policy handler subsystem 216 blocks the password changes until the new password is compliant with the password policy.

In determining a password policy associated with the requested web application 112 if the current web page 114A-N associated with the requested web application 112 requires authentication of the user, the password policy handler subsystem 216 is configured for determining type of authentication fields comprised in the current web page 114A-N based on the determined current web page 114A-N. For example, the type of the authentication field comprises username type, password type, captcha type and the like. Further, the password policy handler subsystem 216 is configured for determining a password policy associated with the determined type of authentication fields based on pre-stored password policy data table. The prestored password policy data table comprises password policies mapped to each type of authentication fields associated with the user. For example, if the authentication field type is a username, then corresponding password policy is determined from the pre stored password policy data table. This policy may be specific to username type authentication type. Similarly, the password type authentication field may have another specific password policy and the like.

The authentication subsystem 218 is configured for authenticating the user on the current web page 114A-N using pre-stored user credentials based on the determined password policy. For example, the authentication subsystem 218 enters the username and password prestored in the database 206 on the web page 114A-N of the application 112. In an embodiment, the authentication subsystem 218 is configured for retrieving the stored username and password (and other information where applicable), applies the username and password information in the web page 114A-N. This process is transparent to users such that users does not require to know the password nor required to enter the password. This process provides great benefits to automate the password management and enforce password policy, without installing any external software on users' local computer, such as user device 108.

In in authenticating the user on the current web page 114A-N using pre-stored user credentials based on the determined password policy, the authentication subsystem 218 is configured for determining network address associated with the user device 108 based on the received request. For example, the network address may be an internet protocol address of the user device 108. This may be determined by analyzing the request sent by the user device 108. The request may be of http or https type. Further, the authentication subsystem 218 is configured for determining type of the requested web application 112 based on the received request. The type of web application 112 may be social platform, a blog, a search engine or bank application or media application or any other type known in the art. Such type of application 112 may be further determined by parsing the request sent by the user. The request may comprise URL of the web application 112 or any other information related to the web application 112. Further, the authentication subsystem 218 is configured for identifying user credentials of the user stored in a database 206 based on the determined type of requested web application 112. Users may have different security credentials for different web applications. The relevant security credentials of the user needs to be identified for requested web application 112. Further, the authentication subsystem 218 is configured for authenticating the user on the current page 114A-N of the request web application 112 using the identified user credentials of the user. For example, the authentication subsystem 218 auto fills the security credentials of the user on the login page.

In authenticating the user on the current web page 114A-N using the pre-stored user credentials based on the determined password policy, the authentication subsystem 218 is further configured for determining whether the user is logging into the requested web application 112 for first time by comparing the user profile with prestored user database. The user database may be stored within the database 206. The user database comprises user profile information, for example, username, age, password, account type, date of birth, email, contact number, photo, password, user ID and the like. The authentication subsystem 218 checks whether the user is a registered user with the web application 112 as soon as a request is received by comparing the user information with stored user profiles in user database. If the user is logging into the requested web application 112 for the first time, then the authentication subsystem 218 is configured for receiving user credentials inputted by the user. This happens in a case if the user is not a registered user and when the user information does not exist in the stored user profiles. Further, the authentication subsystem 218 is configured for storing the received user credentials inputted by the user for subsequent authentication of the user with the requested web application 112. In a case if the user is not a first-time user, the authentication subsystem 218 retrieves the pre stored user credentials of the user and auto fills the credentials onto the web page 114A-N of the web application 112 in order to authenticate the user.

In authenticating the user on the current web page 114A-N using pre-stored user credentials based on the determined password policy, the authentication subsystem 218 is configured for determining whether the user credentials violate one or more rules present in the determined password policy. This is determined by comparing each of the characters of the user credentials with the prestored one or more rules present in the determined password policy. For example, it is determined whether the user password is having special characters, numbers or any other rules defined in the policy. In case if the user credentials is determined to violate the one or more rules present in the determined password policy, then the authentication subsystem 218 is configured for blocking access of the requested web application 112 to the local web browser 110 hosted on the user device 108. In this case, an access blocked message is displayed to the user on the local web browser 110. For example, if a hacker is trying to have an unauthorized access to the web application 112, then access to the web application 112 shall be completely blocked to them upon determining that the credentials used by them violates the one or more rules in the password policy.

In authenticating the user on the current web page 114A-N using pre-stored user credentials based on the determined password policy, the authentication subsystem 218 is configured for determining whether the pre-stored user credentials associated with the user is modified based on one or more user inputs. The one or more user inputs may be received from a user via an input/output device. The one or more user inputs may comprise a credential change request for the web application 112. For example, the one or more user inputs may be 'forgot password', 'forgot username', 'change password', 'change username' and the like. The authentication subsystem 218 is further configured for updating the pre-stored user credentials associated with the determined modification. The modification may be addition, deletion, change, replacement, revision, to the existing user credentials. Further, the authentication subsystem 218 is configured for authenticating the user on the current web page 114A-N using the updated pre-stored user credentials. For example, if user has modified the password, changed password is used for authentication.

In authenticating the user on the current web page 114A-N using pre-stored user credentials based on the determined password policy, the authentication subsystem 218 is configured for determining whether the password policy requires auto generation of random password associated with the user. For example, if the web application 112 requires the user to use random passwords every time when they requests to access the web application 112, then a random password for the user is generated. This may be achieved using any random password generation technique known in the art. Further, the authentication subsystem 218 is configured for generating a random password associated with the user if the password policy requires the auto generation of the random password. This random password may or may not be directly related to user profiles. Further, the authentication subsystem 218 is configured for authenticating the user on the current web page 114A-N using the generated random password.

The routing subsystem 220 is configured for routing the current web page of the local web browser 110 to the requested web application 112 via an intermediate web browser 104 upon successful authentication of the user. The current web page may be routed via cloud service 106.

The access management subsystem 222 is configured for providing access of the web application 112 to the local web browser 110 hosted on the user device 108 based on one or more access privileges associated with the user. In providing access of the web application 112 to the local web browser 110 hosted on the user device 108 based on one or more access privileges associated with the user, the access management subsystem 222 is configured for establishing a direct communication connection between the local web browser 110 hosted on the user device 108 and the requested web application 112. The direct communication connection is only established after successful authentication of the user. Further, the access management subsystem 222 is configured for determining one or more access privileges associated with the user upon establishing the direct communication connection. The one or more access privileges may be subscriptions based, account type based, location based and the like. Further, the access management subsystem 222 is configured for performing one or more actions on the requested web application 112 based on the determined one or more access privileges associated with the user. The one or more actions may be utilizing one or more services of the web application 112, creating new user profiles, access information, download or upload any information and the like.

The cloud database 206 stores the information relating to the web pages 114A-N of the web application 112, user device information and local web browser information. The cloud database 206 is, for example, a structured query language (SQL) data store. The cloud database 206 is configured as cloud-based database implemented in the cloud computing environment 100, where web pages 114A-N are delivered as a service over a cloud platform. The cloud database 206, according to another embodiment of the present disclosure, is a location on a file system directly accessible by the intermediate web browser subsystem 104. The database 206 is configured to store user security credentials, password policy, access privileges, web pages information, browser information, cookies, and other related information.

Figure 3:
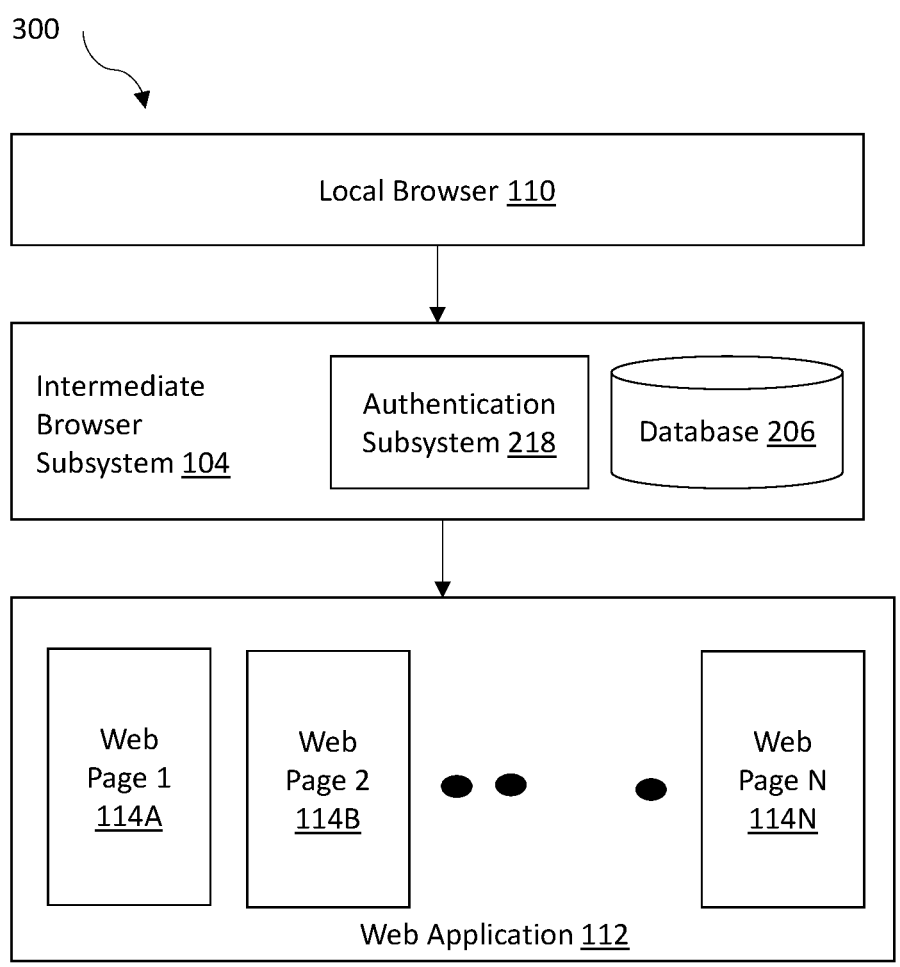
FIG. 3 is a block diagram illustrating an exemplary computing environment depicting interactions between a local web browser, an intermediate web browser subsystem, and web applications, in accordance with an embodiment of the present disclosure.

FIG. 3 is a block diagram illustrating an exemplary computing environment 300 depicting interactions between a local web browser 110, intermediate web browser subsystem 104, and web applications 112, in accordance with an embodiment of the present disclosure. In FIG. 3, the local web browser 110 hosted on the user device 108 interacts with the intermediate web browser subsystem 104 before accessing the web application 112. The intermediate web browser subsystem 104 handles the request triggered by the local web browser 110. The intermediate web browser subsystem 104 comprises authentication subsystem 218 and a database 206 for authenticating the users requesting to access the web application 112. Only once the user is successfully authenticated, the intermediate web browser subsystem 104 allows directs access to the web application 112 to the users via the internet. In case user authentication fails, the access to the web application 112 is blocked by the intermediate web browser subsystem 104. The intermediate web browser subsystem 104 keeps monitoring the web pages 114A-N of the web application 112 and the one or more security credentials of the user. Whenever user at the local web browser 110 requests for accessing a web page 114A-N of the web application 112, the intermediate web browser subsystem 104 determines if the web page 114A-N is a login page. Then, the intermediate browser subsystem 104 determines suitable password policy for the login page which is stored in the database 206. Later, the authentication subsystem 218 of the intermediate browser subsystem 104 retrieves the username and password information and enter the information for the users on the login page to authenticate the user. Any malware running on local web browser 110 cannot detect any events or API calls, thus this method provides a security solution to defeat keyloggers. Upon successful authentication of the user, the intermediate web browser subsystem 104 allows access to the web application 112 at the local web browser 110. In an exemplary embodiment, the computing environment 300 depicts a new way of application access, when the user accesses the applications 112, the user opens the local web browser 110 to connect to an intermediate web browser 104. The intermediate web browser 104 connects to the applications 112. The local web browser 110 interacts with the intermediate web browser 104 through mouse click and keystroke, with visualization of rendering output of the intermediate web browser 104. There are no direct application connections between the local web browser 110 and the applications 112. The environment 300 creates a monitoring and control mechanism called authentication subsystem 218 on the intermediate web browser 104, to monitor how passwords are entered in the login pages in the applications 112. The authentication subsystem 218 detects password strength or duplicated passwords and enforce password policy to prevent weak passwords or duplicated passwords. The authentication subsystem 218 enters the username and password (or other information) for the users, such that the users could access the applications without manually entering the passwords. Since the username and password are entered by authentication subsystem 218 in the intermediate web browsers 104, there is no risks that any malware or keylogger could steal the password.

Figure 4:
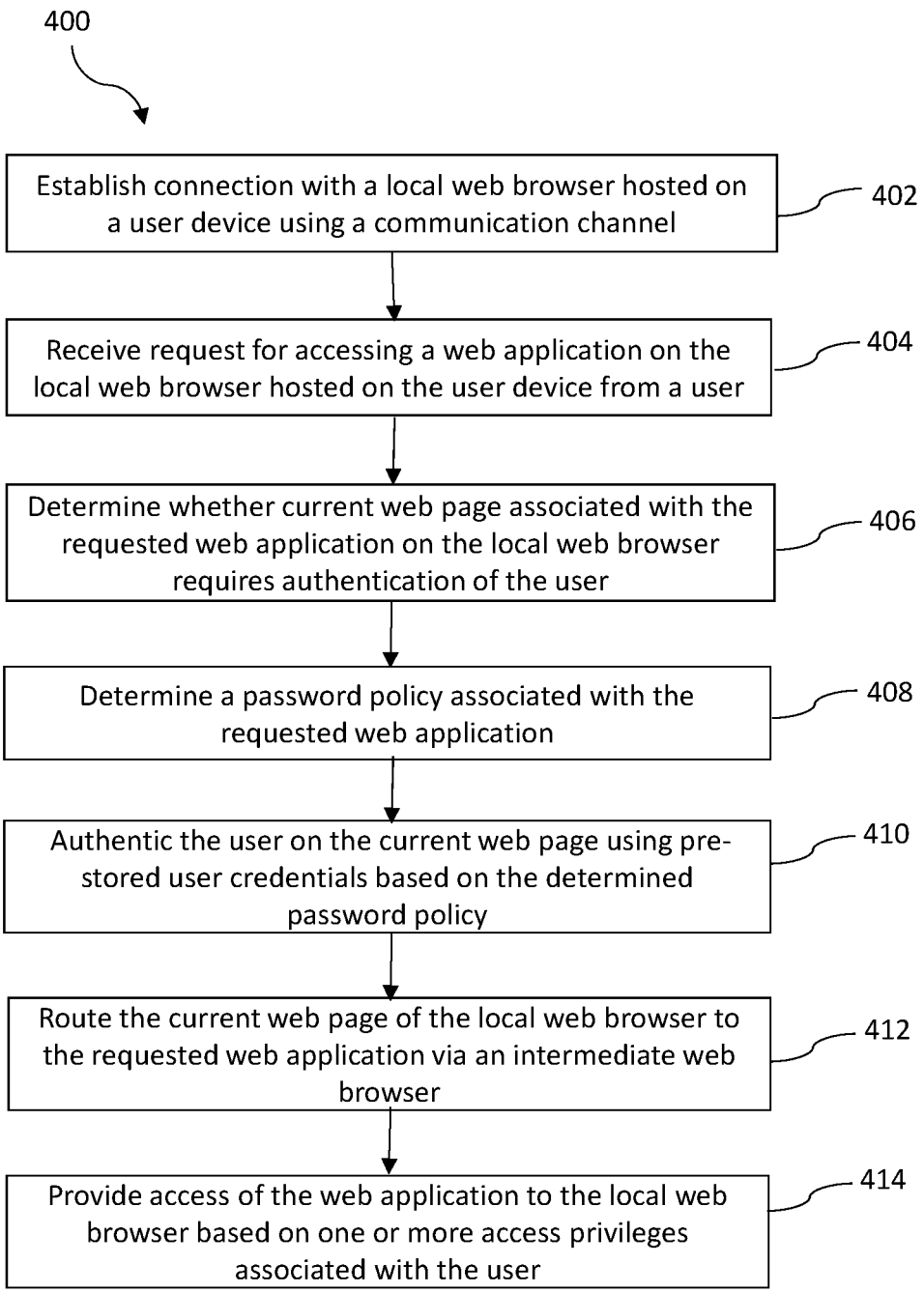
FIG. 4 is a process flow diagram illustrating an exemplary method for managing security credentials of a user in accordance with an embodiment of the present disclosure.

FIG. 4 is a process flow diagram illustrating an exemplary method 400 for managing security credentials of a user in accordance with an embodiment of the present disclosure. At step 402, a connection with a local web browser 110 hosted on a user device 108 is established using a communication channel 106. At step 404, a request for accessing a web application 112 on the local web browser 110 hosted on the user device 108 is received from a user. At step 406, it is determined whether current web page 114A-N associated with the requested web application 112 on the local web browser 110 requires authentication of the user. At step 408, a password policy associated with the requested web application 112 is determined if the current web page 114A-N associated with the requested web application 112 requires authentication of the user. At step 410, the user is authenticated on the current web page 114A-N using pre-stored user credentials based on the determined password policy. At step 412, the current web page of the local web browser 110 is routed to the requested web application 112 via an intermediate web browser 104 upon successful authentication of the user. At step 414, access of the web application 112 is provided to the local web browser 110 hosted on the user device 108 based on one or more access privileges associated with the user.

In determining whether current web page 114A-N associated with the requested web application 112 on the local web browser 110 requires authentication of the user, the method 400 comprises forwarding the received request to the requested web application 112 using the intermediate web browser 104. Further, the method comprises receiving the current web page 114A-N associated with the requested web application 112 in response to the request forwarded to the web application 112. Further, the method 400 comprises identifying whether the current web page 114A-N associated with the requested web application 112 comprises one or more user authentication fields. Further, the method 400 comprises determining whether the current web page 114A-N associated with the requested web application 112 requires user credentials to be inputted onto the one or more user authentication fields.

In determining a password policy associated with the requested web application 112 if the current web page 114A-N associated with the requested web application 112 requires authentication of the user, the method 400 comprises determining type of authentication fields comprised in the current web page 114A-N based on the determined current web page 114A-N. Further, the method 400 comprises determining a password policy associated with the determined type of authentication fields based on pre-stored password policy data table.

In authenticating the user on the current web page 114A-N using pre-stored user credentials based on the determined password policy, the method 400 comprises determining network address associated with the user device 108 based on the received request. The method 400 comprises determining type of the requested web application 112 based on the received request. Further, the method 400 comprises identifying user credentials of the user stored in a database 206 based on the determined type of requested web application 112. Further, the method 400 comprises authenticating the user on the current page 114A-N of the request web application 112 using the identified user credentials of the user.

In authenticating the user on the current web page 114A-N using the pre-stored user credentials based on the determined password policy, the method 400 comprises determining whether the user is logging into the requested web application 112 for first time by comparing the user profile with prestored user database. Further, the method 400 comprises receiving user credentials inputted by the user if the user is logging into the requested web application 112 for the first time. Further, the method 400 comprises storing the received user credentials inputted by the user for subsequent authentication of the user with the requested web application 112.

In authenticating the user on the current web page 114A-N using pre-stored user credentials based on the determined password policy, the method 400 comprises determining whether the user credentials violate one or more rules present in the determined password policy. Further, the method 400 comprises blocking access of the requested web application 112 to the local web browser 110 hosted on the user device 108 if the user credentials is determined to violate the one or more rules present in the determined password policy.

In authenticating the user on the current web page 114A-N using pre-stored user credentials based on the determined password policy, the method 400 comprises determining whether the pre-stored user credentials associated with the user is modified based on one or more user inputs. The method 400 further comprises updating the pre-stored user credentials associated with the determined modification. The method 400 further comprises authenticating the user on the current web page 114A-N using the updated pre-stored user credentials. In authenticating the user on the current web page 114A-N using pre-stored user credentials based on the determined password policy, the method 400 comprises determining whether the password policy requires auto generation of random password associated with the user. The method 400 comprises generating a random password associated with the user if the password policy requires the auto generation of the random password. The method 400 comprises authenticating the user on the current web page 114A-N using the generated random password.

In providing access of the web application 112 to the local web browser 110 hosted on the user device 108 based on one or more access privileges associated with the user, the method 400 comprises establishing a direct communication connection between the local web browser 110 hosted on the user device 108 and the requested web application 112. The method 400 further comprises determining one or more access privileges associated with the user upon establishing the direct communication connection. The method further comprises performing one or more actions on the requested web application 112 based on the determined one or more access privileges associated with the user. The local web browser 110 interacts with the intermediate web browser 104 using one or more events with visualization of rendering output of the intermediate web browser 104. The one or more events include mouse movement & keystroke and the like.

Various embodiments of the present system provide a technical solution to the problem of password management during application access, where the users could be relieved from managing password manually. The present system provides an effective way to isolate password management from the end users while maintaining the easy access scheme. It simplifies user access and reduce attack surfaces of password lost or stealing. The present system is applicable to all web applications regardless of their locations. In the modern cloud environment 100, where the applications may reside in many different locations, including but not limited to, data centre, public clouds such as Amazon AWS Cloud or Microsoft Azure Cloud. It is very difficult to provide a consistent authentication scheme for all applications due to connectivity and network schemes. The present system enables a way to provide secure authentication inline through authentication subsystem 218 in the intermediate web browser subsystem 104, without requiring separated authentication connections to authentication servers. The present system provides an easy way to enable authentication of the applications without complex networking setting. Further, the benefit of the present system is that it not only automates the entering of username and password for the convenience of the users, it also isolates the password information from the users to reduces the risks of password lost/stealing, as well as the efforts to support users who forget their password.

Further, in the present system, password automation happens in intermediate web browser without installing anything on local web browsers. Thus, the present system could apply to any users, including but not limited to contractors or the third-party partners, where it is hard to install agents on the users' computers and laptops. Further, the present system prevents password stealing from any malware on the local computers. A keylogger may infect the local computer, sniff on password entering, and steal the passwords. The present system does password entering in the intermediate web browser, without triggering any event or API on the local web browsers, to prevent keylogger from stealing passwords.

The present system enables centralized password management to protect both internal applications and cloud applications. The present system hides the complexity of password management from users and enforces consistent security password policy such as password strength and password rotation from the centralized management. The policy could be updated and enforced in real-time without waiting updates from each individual user's computer.

In addition, since the authentication subsystem 218 enter the username and password, there are no event or API triggered in the local web browsers 110. Any sniffing malware or keylogger cannot capture any event or API, thus it fully protects the confidentiality of the password from any malware.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A computer-implemented system for managing security credentials of a user in a computing environment, the system comprising:
   one or more hardware processors; and
   a memory coupled to the one or more hardware processors, wherein the memory comprises an intermediate web browser subsystem in the form of programmable instructions executable by the one or more hardware processors, wherein the intermediate web browser subsystem comprises:
      a communication subsystem configured for establishing a connection with a local web browser hosted on a user device using a communication channel;
      a request handler subsystem configured for receiving a request for accessing a web application on the local web browser hosted on the user device from a user;
      a web page handler subsystem configured for determining whether current web page associated with the requested web application on the local web browser requires authentication of the user;
      a password policy handler subsystem configured for determining a password policy associated with the requested web application if the current web page associated with the requested web application requires authentication of the user, wherein the password policy corresponds to a set of rules governing a password scheme or a standard set forth by the web application;
      an authentication subsystem configured for authenticating the user on the current web page using pre-stored user credentials based on the determined password policy, wherein the authentication subsystem is configured for:
         determining network address associated with the user device based on the received request;
         determining type of the requested web application based on the received request:
         identifying user credentials of the user stored in a database based on the determined type of requested web application; and
         authenticating the user on the current page of the request web application using the identified user credentials of the user;
      a routing subsystem configured for routing the current web page of the local web browser to the requested web application via the intermediate web browser subsystem upon successful authentication of the user; and
      an access management subsystem configured for providing access of the web application to the local web browser hosted on the user device based on one or more access privileges associated with the user.

2. The computer-implemented system of claim 1, wherein in determining whether current web page associated with the requested web application on the local web browser requires authentication of the user, the web page handler subsystem is configured for:
   forwarding the received request to the requested web application using the intermediate web browser;
   receiving the current web page associated with the requested web application in response to the request forwarded to the web application;
   identifying whether the current web page associated with the requested web application comprises one or more user authentication fields; and
   determining whether the current web page associated with the requested web application requires user credentials to be inputted onto the one or more user authentication fields.

3. The computer-implemented system of claim 1, wherein in determining the password policy associated with the requested web application if the current web page associated with the requested web application requires authentication of the user, the password policy handler subsystem is configured for:
   determining type of authentication fields comprised in the current web page based on the determined current web page; and
   determining the password policy associated with the determined type of authentication fields based on a pre-stored password policy data table.

4. The computer-implemented system of claim 1, wherein in authenticating the user on the current web page using the pre-stored user credentials based on the determined password policy, the authentication subsystem is configured for:
   determining whether the user is logging into the requested web application for first time by comparing a user profile with prestored user database;
   receiving user credentials inputted by the user if the user is logging into the requested web application for the first time; and
   storing the received user credentials inputted by the user for subsequent authentication of the user with the requested web application.

5. The computer-implemented system of claim 1, wherein in authenticating the user on the current web page using pre-stored user credentials based on the determined password policy, the authentication subsystem is configured for:
   determining whether the user credentials violate one or more rules present in the determined password policy; and
   blocking access of the requested web application to the local web browser hosted on the user device if the user credentials is determined to violate the one or more rules present in the determined password policy.

6. The computer-implemented system of claim 1, wherein in authenticating the user on the current web page using pre-stored user credentials based on the determined password policy the authentication subsystem is configured for:
   determining whether the pre-stored user credentials associated with the user is modified based on one or more user inputs;

updating the pre-stored user credentials associated with the determined modification; and authenticating the user on the current web page using the updated pre-stored user credentials.

7. The computer-implemented system of claim 1, wherein in authenticating the user on the current web page using pre-stored user credentials based on the determined password policy, the authentication subsystem is configured for:

determining whether the password policy requires auto generation of random password associated with the user;

generating a random password associated with the user if the password policy requires the auto generation of the random password; and authenticating the user on the current web page using the generated random password.

8. The computer-implemented system of claim 1, wherein in providing access of the web application to the local web browser hosted on the user device based on one or more access privileges associated with the user, the access management subsystem is configured for:

establishing a direct communication connection between the local web browser hosted on the user device and the requested web application;

determining one or more access privileges associated with the user upon establishing the direct communication connection; and performing one or more actions on the requested web application based on the determined one or more access privileges associated with the user.

9. A computer-implemented method for managing security credentials of a user in a computing environment, the method comprising:

establishing, by a processor, a connection with a local web browser hosted on a user device using a communication channel;

receiving, by the processor, a request for accessing a web application on the local web browser hosted on the user device from a user;

determining, by the processor, whether current web page associated with the requested web application on the local web browser requires authentication of the user;

determining, by the processor, a password policy associated with the requested web application if the current web page associated with the requested web application requires authentication of the user, wherein the password policy corresponds to a set of rules governing a password scheme or a standard set forth by the web application;

authenticating, by the processor, the user on the current web page using pre-stored user credentials based on the determined password policy, wherein in authenticating, an authentication subsystem is configured for:

determining network address associated with the user device based on the received request:

determining type of the requested web application based on the received request:

identifying user credentials of the user stored in a database based on the determined type of requested web application; and authenticating the user on the current page of the request web application using the identified user credentials of the user;

routing, by the processor, the current web page of the local web browser to the requested web application via the intermediate web browser subsystem upon successful authentication of the user; and providing, by the processor, access of the web application to the local web browser hosted on the user device based on one or more access privileges associated with the user.

10. The computer-implemented method of claim 9, wherein determining whether current web page associated with the requested web application on the local web browser requires authentication of the user comprises:

forwarding the received request to the requested web application using the intermediate web browser;

receiving the current web page associated with the requested web application in response to the request forwarded to the web application;

identifying whether the current web page associated with the requested web application comprises one or more user authentication fields; and determining whether the current web page associated with the requested web application requires user credentials to be inputted onto the one or more user authentication fields.

11. The computer-implemented method of claim 9, wherein determining the password policy associated with the requested web application if the current web page associated with the requested web application requires authentication of the user comprises:

determining type of authentication fields comprised in the current web page based on the determined current web page; and determining the password policy associated with the determined type of authentication fields based on a pre-stored password policy data table.

12. The computer-implemented method of claim 9, wherein authenticating the user on the current web page using the pre-stored user credentials based on the determined password policy comprises:

determining whether the user is logging into the requested web application for first time by comparing a user profile with prestored user database;

receiving user credentials inputted by the user if the user is logging into the requested web application for the first time; and storing the received user credentials inputted by the user for subsequent authentication of the user with the requested web application.

13. The computer-implemented method of claim 9, wherein authenticating the user on the current web page using pre-stored user credentials based on the determined password policy comprises:

determining whether the user credentials violate one or more rules present in the determined password policy; and blocking access of the requested web application to the local web browser hosted on the user device if the user credentials is determined to violate the one or more rules present in the determined password policy.

14. The computer-implemented method of claim 9, wherein authenticating the user on the current web page using pre-stored user credentials based on the determined password policy comprises:

determining whether the pre-stored user credentials associated with the user is modified based on one or more user inputs;

updating the pre-stored user credentials associated with the determined modification; and authenticating the user on the current web page using the updated pre-stored user credentials.

15. The computer-implemented method of claim 9, wherein authenticating the user on the current web page using pre-stored user credentials based on the determined password policy comprises:
- determining whether the password policy requires auto generation of random password associated with the user;
- generating a random password associated with the user if the password policy requires the auto generation of the random password; and
- authenticating the user on the current web page using the generated random password.

16. The computer-implemented method of claim 9, wherein providing access of the web application to the local web browser hosted on the user device based on one or more access privileges associated with the user comprises:
- establishing a direct communication connection between the local web browser hosted on the user device and the requested web application;
- determining one or more access privileges associated with the user upon establishing the direct communication connection; and
- performing one or more actions on the requested web application based on the determined one or more access privileges associated with the user.

17. The computer-implemented method of claim 9, wherein the local web browser interacts with the intermediate web browser using one or more events with visualization of rendering output of the intermediate web browser.

18. A computer-implemented non-transitory computer-readable storage medium having instructions stored therein that when executed by a hardware processor, cause the processor to perform method steps comprising:
- establishing a connection with a local web browser hosted on a user device using a communication channel;
- receiving a request for accessing a web application on the local web browser hosted on the user device from a user;
- determining whether current web page associated with the requested web application on the local web browser requires authentication of the user;
- determining a password policy associated with the requested web application if the current web page associated with the requested web application requires authentication of the user, wherein the password policy corresponds to a set of rules governing a password scheme or a standard set forth by the web application;
- authenticating the user on the current web page using pre-stored user credentials based on the determined password policy; wherein in authenticating, an authentication subsystem is configured for:
  - determining network address associated with the user device based on the received request:
  - determining type of the requested web application based on the received request;
  - identifying user credentials of the user stored in a database based on the determined type of requested web application; and
  - authenticating the user on the current page of the request web application using the identified user credentials of the user;
- routing the current web page of the local web browser to the requested web application via the intermediate web browser subsystem upon successful authentication of the user; and
- providing access of the web application to the local web browser hosted on the user device based on one or more access privileges associated with the user.

* * * * *